Dec. 31, 1957   M. A. KNAPP   2,818,279
LUGGED PIPE COUPLING WITH POSITIVE LOCK MEANS
Filed Dec. 3, 1953   2 Sheets-Sheet 1
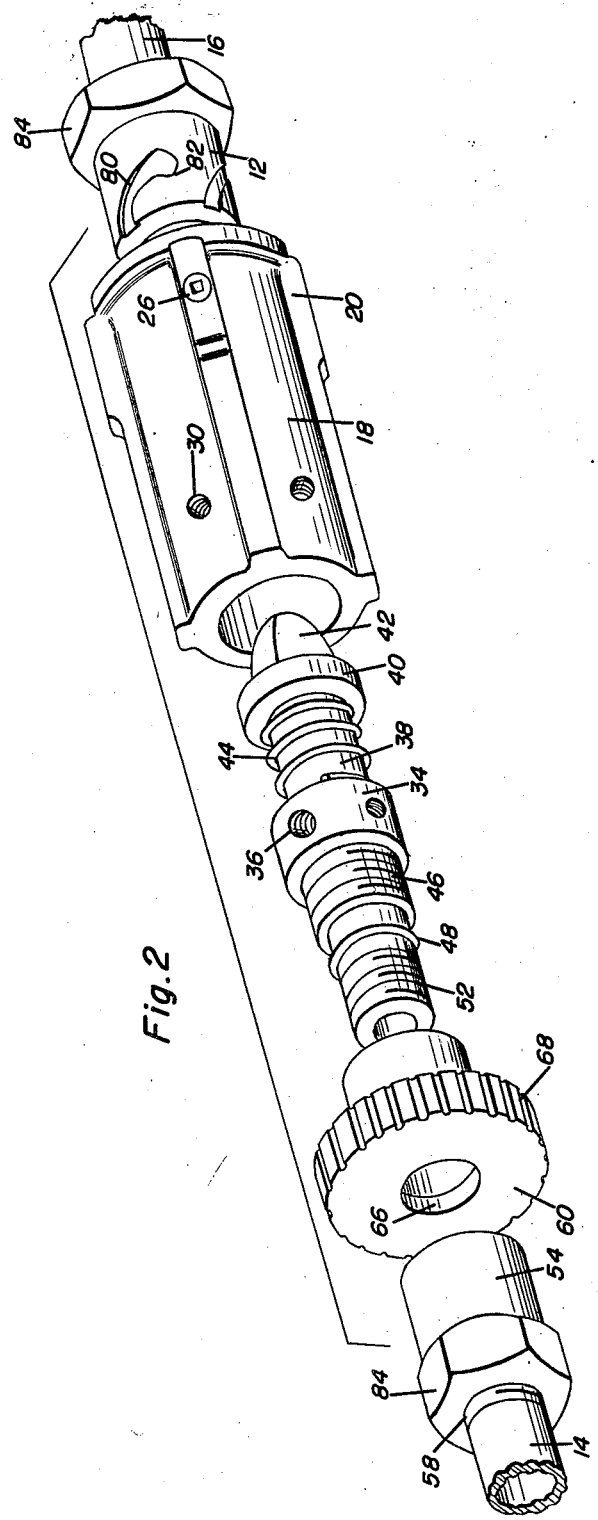
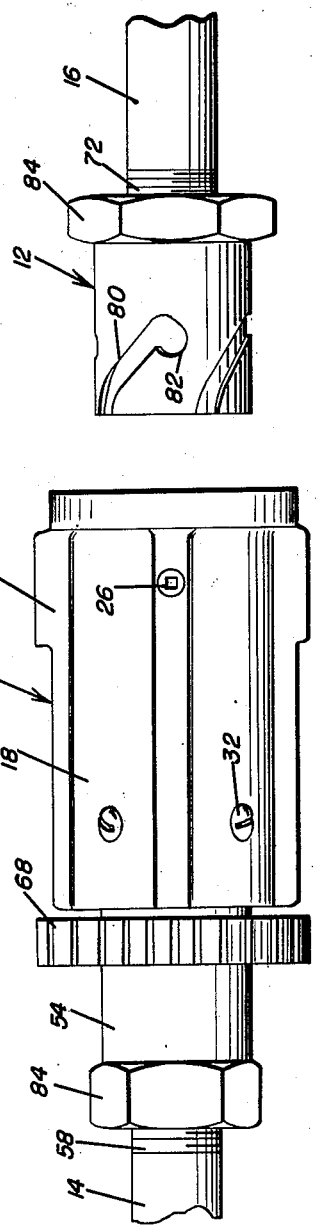
Marion A. Knapp
INVENTOR.
BY
Attorneys Dec. 31, 1957  M. A. KNAPP  2,818,279
LUGGED PIPE COUPLING WITH POSITIVE LOCK MEANS
Filed Dec. 3, 1953  2 Sheets-Sheet 2
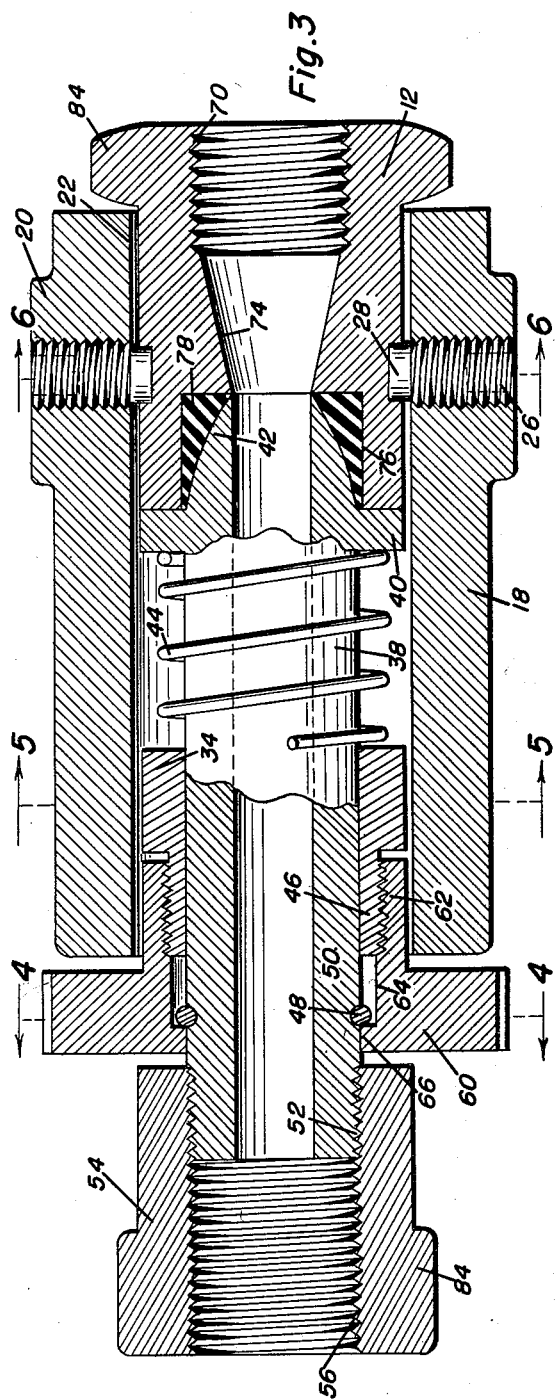
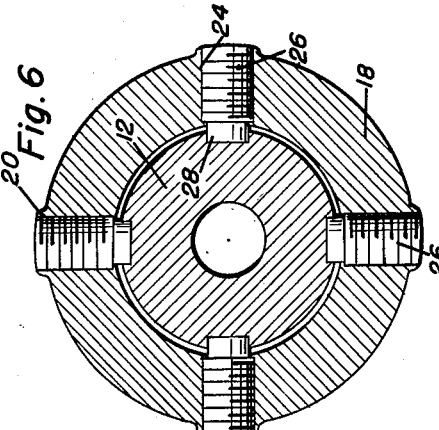
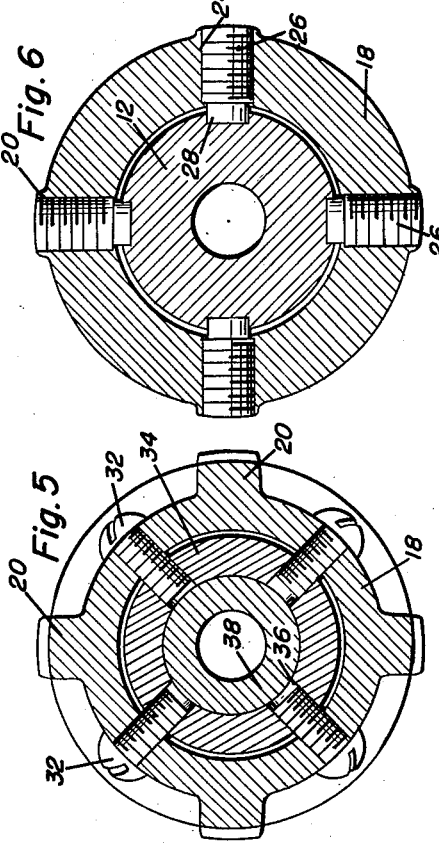
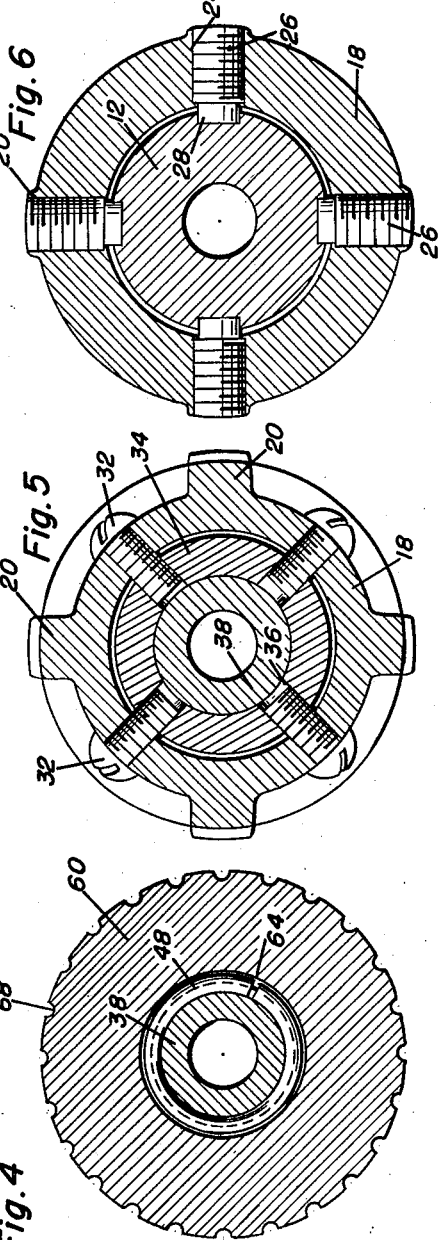
Marion A. Knapp
INVENTOR.
BY
Attorneys United States Patent Office 2,818,279
Patented Dec. 31, 1957

2,818,279

LUGGED PIPE COUPLING WITH POSITIVE LOCK MEANS

Marion A. Knapp, Mansfield, Ohio, assignor to Rico Enterprises, Inc., Mansfield, Ohio, a corporation of Ohio Application December 3, 1953, Serial No. 395,859

4 Claims. (Cl. 285—89)

This invention relates to a quick locking coupling and especially provides a device for easily coupling and uncoupling high pressure lines and securely locking these lines in coupled relationship. Specifically, this invention relates to an improvement of the coupling in Patent No. 2,529,821, issued on November 14, 1950.

An object of this invention is to provide a quick locking coupling including a spring biased bayonet type coupling with means for tensioning the spring for securely retaining the bayonet coupling in assembled relation.

Another object of this invention is to provide a quick locking coupling which is especially useful for inflating expansible air bags utilized in the manufacture of tire casings wherein the couplings must be manipulated in a restricted space and prevent the discharge of superheated materials onto the hands of the person operating the coupling.

A still further object of this invention is to provide a quick locking coupling and uncoupling device which is simple in construction, easy and efficient in operation and constructed of readily obtainable materials, thereby assuring a minimum manufacturing cost and sale price.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the quick locking coupling of this invention in disconnected position;

Figure 2 is a group perspective showing the present invention in disassembled condition;

Figure 3 is a longitudinal, vertical section taken substantially along a vertical plane through the longitudinal center line of the coupling of the present invention in assembled position;

Figure 4 is a transverse, vertical section taken substantially along section line 4—4 of Figure 3 showing the specific construction of the lock collar;

Figure 5 is a transverse, vertical section taken substantially along section line 5—5 of Figure 3 showing details of the backspacing adjustment; and Figure 6 is a transverse, vertical section taken substantially along section line 6—6 of Figure 3 showing the details of the projections on the interior of the first cylindrical member.

Referring now especially to Figure 1, it will be seen that the numeral 10 generally designates a first cylindrical portion and the numeral 12 generally designates a second cylindrical portion telescopically received in the first cylindrical member 10 for connecting the tubular lines 14 and 16 wherein fluid under pressure may be passed through the lines 14 and 16 and the coupling members 10 and 12.

The first cylindrical member 10 is provided with a generally elongated tubular cylinder 18 having longitudinal ribs 20 radially spaced thereabout for gripping the tubular member 18. The inner surface of the tubular member 18 is generally a smooth cylinder, as indicated by the numeral 22. As specifically shown, there are four ribs 20 and extending through each of the ribs and in communication with the interior of the tubular member 18 is a threaded bore 24 for receiving threaded screws 26 having a projecting end portion 28 projecting into the interior of the tubular member 18. Remote from the screw threaded apertures 24 in the ribs 20 is a plurality of radially spaced screw threaded apertures 30 positioned between the ribs 20 for receiving screw fasteners 32. A back spacing collar 34 having screw threaded apertures 36 therein is engaged by the screw fasteners 32 and held in rigid relation to the tubular sleeve 18. Slidably positioned in the collar 34 is a tubular sleeve 38 having a longitudinal passage through the center thereof. The sleeve 38 has a peripheral flange 40 adjacent one end and a smoothly tapered end portion 42 extending from the flange 40 to the remote end of the tubular sleeve 38. Disposed between the flange 40 and the spacing collar 34 is a compression coil spring 44 which abuts the flange 40 and the collar 34 for urging these members away from each other. The collar 34 is provided with an externally threaded portion 46 remote from the spring 44 and a spring ring 48 is positioned in a recess 50 in the outer circumference of the tubular member 38 in spaced relation to the end of the collar 34 remote from the spring 44. The remote end of the tubular sleeve 38 in relation to the tapered portion 42 is externally screw threaded at 52 for receiving a fitting 54 which is internally screw threaded at 56 for receiving the external screw threads 58 of the tubular pipe 14.

A lock collar 60 is rotatably positioned around the tubular sleeve 38 and includes an internally threaded portion 62 for engagement with the threaded portion 46 of the spacing collar 34. The lock collar 60 includes an enlarged central bore 64 for slidably receiving the spring ring 48 and the collar 60 also includes an internal flange 66 closely receiving the outer periphery of the sleeve 38, thereby capturing the lock collar 60 in relation to the sleeve 38. The outer periphery of the locking collar 60 is provided with transverse grooves 68 for easier gripping by a person's fingers and it will be seen that the collar 60 is slightly larger than the tubular member 18, thereby facilitating the manipulation of the collar 60. It will be understood that by rotating the collar 60, the tubular sleeve 38 may be adjusted in longitudinal relation to the tubular member 18 for a purpose described hereinafter.

As illustrated in the drawings, the second tubular member 12 includes an internal passage having an internally threaded portion 70 for attachment to the external threaded portion 72 of the tubular pipe 16 and an inwardly tapering passage 74 for alignment with the passage through the tubular sleeve 38. At the end of the member 12 remote from the threaded portion 70 an enlarged bore 76 is provided which abuts against the face of the flange 40 and surrounds the tapered end 42 of the sleeve 38. The socket-like bore 76 is larger than the tapered end portion 72 and is provided with a tapered sealing gasket 78 which conforms generally to the shape of the tapered end portion 42 of the sleeve 38 thereby providing a fluid-tight seal between the sleeve 38 and the passage 74 in the tubular member 12. On the outer surface of the body of the tubular member 12 is provided a plurality of spiral grooves 80 leading inwardly from the inner edge of the cylindrical member 12. At the inner end of the spiral grooves 80 is a re-entrant portion 82 forming a seat in the nature of a bayonet slot. The grooves 80 are spaced about the periphery of the cylindrical member 12 for receiving the projecting portion 28 of the set screws 26.

wherein the tubular sleeve 18 along with the tubular member 38 is secured to the cylindrical member 12 in fluid-tight relation. It will be seen that the fitting 54 and the cylindrical member 12 are provided with polygonal sections 84 for engagement with a wrench for tightening the fittings to the respective pipes 14 and 16.

In practical operation of the quick locking coupling of this invention, the locking collar 60 is unthreaded or backed off from the spacing collar 34 a sufficient distance to permit rearward movement of the sleeve 38 along with the spring ring 48 to allow the projections 28 to ride up the spiral grooves 80 and become seated in the reentrant seats 82. The locking collar 60 is then screwed onto the collar 34 until the flange 66 engages the spring ring 48 which urges the sleeve 38 and the cylindrical member 12 towards the projections 28, thereby firmly seating the projections 28 in the seats 82. Before disconnecting the coupling, the locking collar 60 must be backed off or unscrewed a sufficient distance to permit the movement of the sleeve 38 and the spring ring 48 a sufficient distance to allow the projections 28 to move out of the seats 82 and then downwardly along the spiral grooves 80. The spring 44 resiliently retains the projections 28 in the seats 82 while the locking collar 60 is being manipulated for either locking or unlocking the coupling. It will be understood that the operation of this device is very quick, accurate and positive, as the tubular member 18 and the tubular member 12 are easily connected, and by very little rotation of the locking collar 60, the projections are securely locked in the seats 82, thereby preventing the accidental disconnection of this coupling and the consequent damaging results. It will be understood that this particular coupling may be utilized in any connection requiring a fluid-tight seal and a positive lock. Obviously, the various elements of this invention may be constructed of readily obtainable materials thereby maintaining a low sale price wherein the utilization of this locking coupling will be economically feasible.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A quick locking coupling comprising a first cylindrical member provided with a passage, a projection extending into said passage, a second cylindrical member for selective telescopic engagement with said first cylindrical member, a spiral groove in the outer surface of the second cylindrical member for receiving said projection, a seat at the inner end of said groove, resilient means carried by said first member for urging the second member outwardly of the first member for releasably retaining the projection in said seat, and means for locking said projection in said seat thereby retaining said members in assembled relation, a tubular sleeve slidably positioned in said first member, said locking means includes a collar captively positioned on said sleeve and threadedly engaging said first cylindrical member for longitudinal movement of said sleeve, said sleeve abutting said second cylindrical member when in assembled relation wherein said second member may be moved in relation to said projection thereby locking said projection in said seat.

2. A quick locking coupling comprising a first cylindrical member provided with a passage, a projection extending into said passage, a second cylindrical member for selective telescopic engagement with said first cylindrical member, a spiral groove in the outer surface of the second cylindrical member for receiving said projection, a seat at the inner end of said groove, resilient means carried by said first member for urging the second member outwardly of the first member for releasably retaining the projection in said seat, and means for locking said projection in said seat thereby retaining said members in assembled relation, a tubular sleeve slidably positioned in said first member, said locking means includes a collar captively positioned on said sleeve and threadedly engaging said first cylindrical member for longitudinal movement of said sleeve, said sleeve abutting said second cylindrical member when in assembled relation wherein said second member may be moved in relation to said projection thereby locking said projection in said seat, a spacing collar provided between said sleeve and first member and being rigidly secured to said first member, said spacing collar having an external threaded portion, and said locking collar having an internal threaded portion engaging said spacing collar wherein said locking collar and a sleeve may be adjusted.

3. A quick locking coupling comprising a first cylindrical member provided with a passage, a projection extending into said passage, a second cylindrical member for selective telescopic engagement with said first cylindrical member, a spiral groove in the outer surface of the second cylindrical member for receiving said projection, a seat at the inner end of said groove, resilient means carried by said first member for urging the second member outwardly of the first member for releasably retaining the projection in said seat, and means for locking said projection in said seat thereby retaining said members in assembled relation, a tubular sleeve slidably positioned in said first member, said locking means includes a collar captively positioned on said sleeve and threadedly engaging said first cylindrical member for longitudinal movement of said sleeve, said sleeve abutting said second cylindrical member when in assembled relation wherein said second member may be moved in relation to said projection thereby locking said projection in said seat, said locking collar including an inner flange closely surrounding said sleeve, a split spring ring positioned on said sleeve and engaging one side of said flange, a fitting threadably positioned on said sleeve and including an end portion for engaging the other side of said flange thereby limiting axial movement of the fitting for captively retaining said locking collar on said sleeve.

4. A quick locking coupling for fluid carrying flexible conduits comprising a cylindrical sleeve having a longitudinal bore extending therethrough with one end thereof being communicated with one of the conduits, a cylindrical member slidably receiving said sleeve and projecting longitudinally beyond the sleeve, said sleeve having an inner end forming a seat, a plurality of inwardly extending projections on said cylindrical member adjacent the inner end of the sleeve, a cylindrical adapter having a longitudinal bore extending therethrough with the outer end thereof being communicated with the other of the conduits, said adapter being telescopically received within said cylindrical member and having a seat in the inner end thereof for engagement with the seat on the sleeve, said adapter having spiral grooves on the outer surface thereof extending inwardly from the inner end thereof for receiving said projections, each of said grooves having a re-entrant seat in the bottom thereof for receiving said projections, spring means interconnecting said sleeve and cylindrical member for urging the sleeve inwardly for resiliently retaining the seats in fluid tight relation and releasably retaining the projections in the re-entrant seats in the grooves, and quick acting manually actuated lock means interconnecting said sleeve and cylindrical member for positively moving the sleeve inwardly thus positively locking the projections in the reentrant seats in the grooves and preventing displacement thereof until the manually actuated lock means is released, said spring means retaining the projections in the seats in the grooves while the manually actuated lock means is actuated.

References Cited in the file of this patent

UNITED STATES PATENTS

| | | |
|---|---|---|
| 1,029,613 | Johnson | June 18, 1912 |
| 1,487,696 | Smith | Mar. 18, 1924 |
| 2,298,117 | Franck | Oct. 26, 1942 |
| 2,333,243 | Glab | Nov. 2, 1943 |
| 2,529,821 | Snider | Nov. 14, 1950 |
| 2,613,089 | Maiman | Oct. 7, 1952 |